Oct. 19, 1965   J. R. FONDA   3,213,215
CAM OPERATED SWITCH FOR WATER METER
Filed Dec. 31, 1962   3 Sheets-Sheet 1

INVENTOR.
JOHN R. FONDA
BY
Cullen, Sloman & Cantor
ATTORNEYS

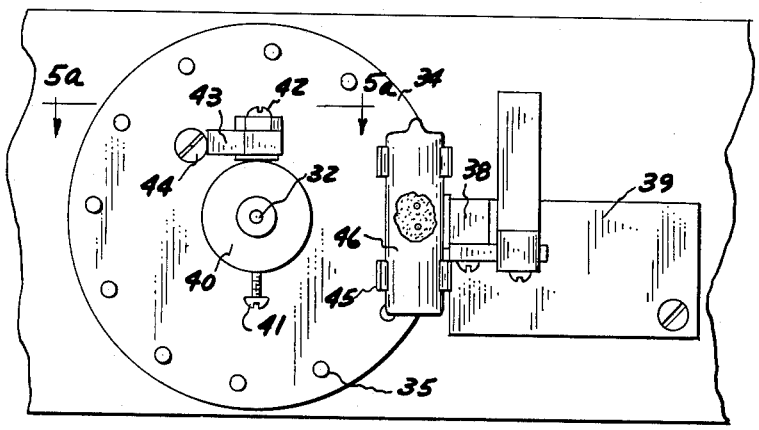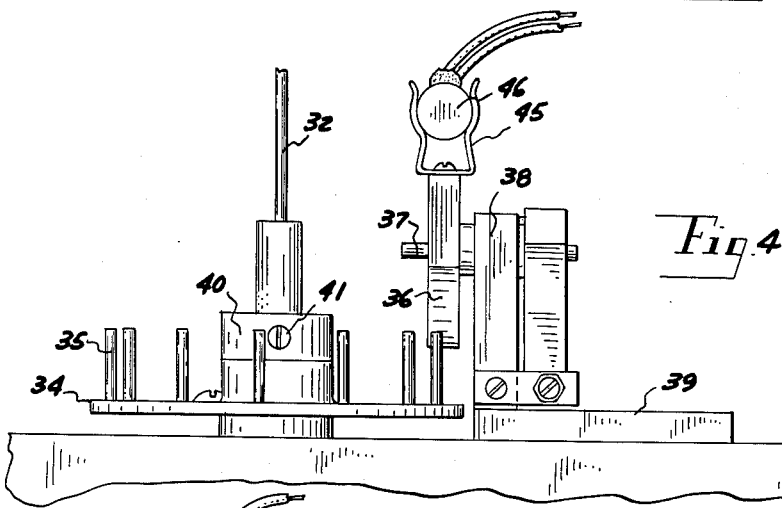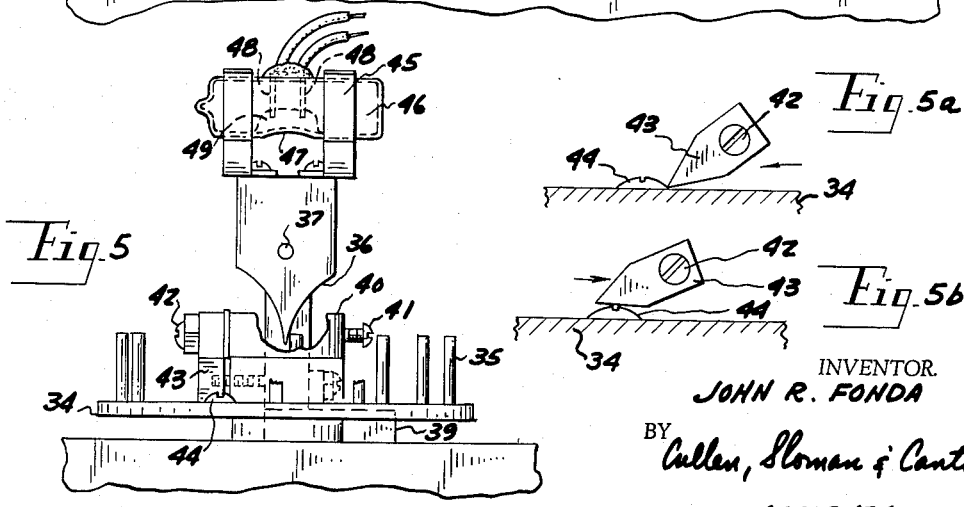

Oct. 19, 1965  J. R. FONDA  3,213,215
CAM OPERATED SWITCH FOR WATER METER
Filed Dec. 31, 1962  3 Sheets-Sheet 3

INVENTOR.
JOHN R. FONDA
BY *Cullen, Sloman & Cantor*
ATTORNEYS

3,213,215
CAM OPERATED SWITCH FOR WATER METER
John R. Fonda, Detroit, Mich., assignor to
Dihydrol Company, Detroit, Mich.
Filed Dec. 31, 1962, Ser. No. 248,514
2 Claims. (Cl. 200—32)

A prior patent to Van B. Coldsnow, 2,530,682 of November 21, 1950, shows a water treatment system having a pump which dispenses minute metered quantities of water treatment fluid proportionately into a water line. The pump is actuated by a pump motor whose circuit is opened and closed repeatedly by a switch. The actuation means for the switch includes a turntable connected to a water meter whereby the movement of the meter in accordance with the amount of water passing by it will cause a corresponding number of switch closings per unit of water moving by the meter and thus cause a corresponding number of pump motor actuations and pump actuations for the purposes desired.

The invention hereof aims to provide a novel switch and switch actuation mechanism as part of a combination employing a water meter as the prime mover for controlling switch closings of the circuit that supplies the pump motor.

It is understood that in the system heretofore known as described in said patent a turntable is coupled to the meter shaft and rotates in response to the meter shaft rotation. The turntable has on it a number of spaced pins which engage a rocker mounting a mercury tube switch so that switch closings are effected as the pins move around and engage and rock the rocker. Switch closings close the circuit to the pump motor and thus actuate the pump. The improvements in this application relate to a system characterized also by the use of a turntable having pins which cooperatively function with respect to a rocker mounting a mercury tube switch for effecting switch closing and most specifically the improvements hereof relate to the formation of the pins of the turntable, the coupling between the turntable and the meter shaft, the rocker, and the mercury tube switch mounted on such rocker.

A primary object of the present invention is to provide a considerably simplified and far superior switch and switch actuating mechanism free of springs, particularly leaf springs, having considerably less components than devices heretofore known, and free of a variety of components such as articulated members, switch arm stops, and the like as heretofore known, the result being a far superior, more nearly foolproof and considerably simpler construction.

In addition, the switch mechanism hereof includes a novel form of mercury tube switch characterized by providing two switch closings for each turntable pin, one switch closing occurring as the pin passes by a rocker which mounts the mercury tube switch and the second switch closing occurring when the rocker returns to normal position as the pin leaves such rocker. In this way, the capacity of the system is doubled without doubling the number of pins and without the use of gearing or the like for changing ratios and proportions of movements of the parts. All this arises from the nature of the mercury tube switch employed and from the nature of the rocker construction which actuates or rocks such mercury tube switch.

A still further object is to provide a novel form of coupler between the meter shaft and the turntable which is far simpler in construction than the couplings heretofore known and yet which insures the turntable rotating only in response to a proper direction rotation of the meter shaft whereby reverse direction of the meter shaft in response to backflow in the system will be certain not to cause rotation of the turntable.

A still further object of the present invention is to provide a coupler of novel form characterized by the fact that the coupler can be reversed so as to accommodate to meters of either of two forms, those which operate in an opposite direction for normal flow. Regardless of which type meter is used, by proper setting of the coupler in the initial setup of the installation of the system, the system can accommodate itself to the specific meter selected without adjustments, change of parts, etc., all using exactly the same parts for either type of meter, but merely requiring a very simple reversal of the coupling in the initial installation.

A still further object of the present invention is to provide in such system a switch and switch actuation mechanism of such a nature as to insure against the possibility of the switch remaining closed for any appreciable period in response to defective operation of the system. The switch hereof is so constructed that it closes only momentarily and it is impossible for the switch to remain closed for any prolonged period.

In addition, the system hereof is so constructed that while, as illustrated, it employs but one switch for one side or one line of the circuit supplying the pump motor, it is a very simple matter to mount several switches on the same rocker so as to make and break several lines simultaneously. This may be the two lines of a pump motor circuit so that the two lines make and break simultaneously in response to the same single turntable movement. While this is not illustrated in the drawings hereof, it is understood that this is within the scope of the invention hereof because the changes as here suggested from a single pole switch operation to a double pole switch operation are well within the skill of a mechanic having a switch hereof before him and having instructions to revise such switch for double pole operation.

In addition, where a switching arrangement hereof is equipped with several switches per rocker as above described, it is possible to use these several switches to make and break several different lines. This may be the several lines for one pump circuit, as above, or it may be several lines of several different pump circuits, all as desired and all within the skill of the mechanic in this art having before him the switch arrangement illustrated here by way of example in use with a single switch mounted on the rocker.

The switch employed here as described above is such that it is impossible for the contacts to remain connected longer than the shortest possible instant as the mercury bubble passes by them and bridges them and is so constructed that it is impossible for the mercury bubble of the switch to remain in contact bridging position. This in turn improves the action of the switch, speeding up its action, and at the same time eliminates problems arising from the use of switches of a type where the contacts could be bridged by the mercury bubble for a prolonged period, these problems arising due to such factors as heat generated by continuous contact and circuit closing, and the like.

Because the switch hereof is of the nature described, it is not necessary to use delayed action type fuses commonly used with systems of this general character and it becomes possible to eliminate these delayed action type fuses and to employ fast acting circuit protective fuses or circuit breakers where desired and particularly to employ direct line fuses which eliminates certain servicing problems.

A still further object is to provide a switching arrangement employing magnets on the turntable for rocking the rocker magnetically rather than to employ pins striking or engaging the rocker. The latter construction, while desirable in most instances, can possibly be considered objectionable for use in a fire hazard atmosphere where it is desirable to eliminate the possibility of a spark formed by the striking of pins against a rocker. The magnetic arrangement herein disclosed eliminates direct engagement or impact between the pins and the rocker and thus eliminates the possibility of a spark occurring at this point.

The magnetic action is considerably smoother than a pin-rocker engaging action and may be desirable in certain installations where smoothness of operation is a desirable factor.

A system constructed in accordance with the foregoing is disclosed in the appended drawings.

In these drawings:

FIG. 3 is a top plan view of a part of the switch and switch actuation mechanism.

FIG. 4 is an elevation view as if from the bottom of FIG. 3.

FIG. 5 is a side view as if from the left side of FIG. 4 with parts broken away for clarity.

FIGS. 5A and 5B are fragmentary views on line 5A—5A of FIG. 3, showing the operation of certain parts.

The system

Figure 1:
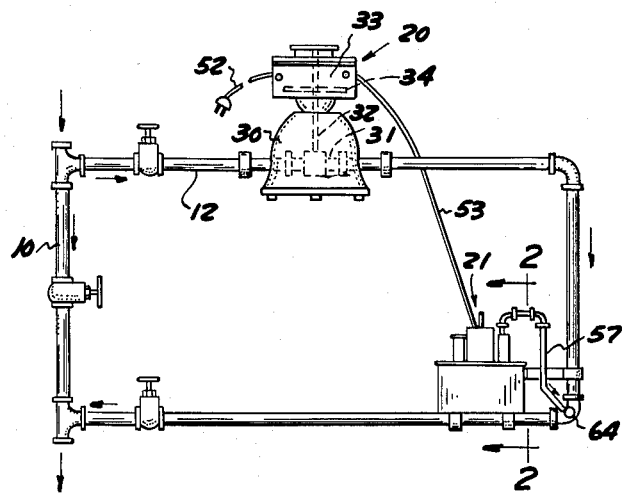
FIG. 1 shows the system generally and diagrammatically.
Figure 2:
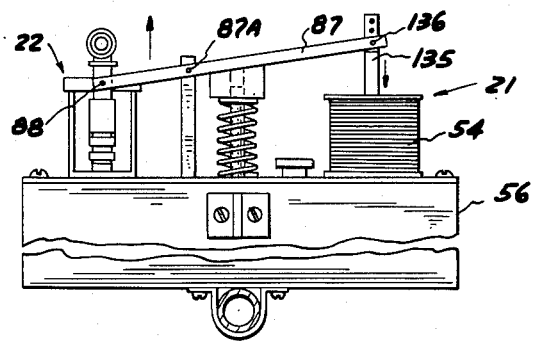
FIG. 2 is a section view of the metering pump and pump motor as if on line 2—2 of FIG. 1.

FIGS. 1–2 show a water main or line 10 having a branch 12 equipped with a switch 20, a pump motor 21 and a metering pump 22.

In branch 12 is a water meter 30 whose rotary member 31 is provided with a shaft 32 entering a switch housing 33.

Switch actuation

Meter shaft 32 rotates so as to rotate a turntable 34, FIG. 3, having numerous spaced pins 35 for successively engaging the lower tapered end of a rocker 36 pivoted or journalled at 37 to a mounting bracket 38 fixed to a base 39. Rocker 36 is weighted so as normally to occupy a vertical position and to return to that vertical position when moved momentarily sidewise by being engaged successively by pins 35 of turntable 34.

Coupling

Coupling between meter shaft 32 and turntable 34 is established as follows:

Meter shaft 32 is surrounded by and journals turntable 34. On meter shaft 32 is a hub 40 secured to it by a set screw 41 and having a pawl shaft 42 on which is journalled a weighted pawl 43 whose end is tapered to engage a stop 44 on turntable 34. Rotation of meter shaft 32 in the proper direction (FIG. 5A) causes the end of pawl 43 to drop and engage turntable stop 44 and rotate turntable 34 continuously along with meter shaft 32. In the event of backflow causing meter shaft 32 to rotate in the opposite or wrong direction, pawl 43 will ride freely (FIG. 5B) over stop 44 of turntable 34 and thus not engage it and not cause turntable 34 to rotate with meter shaft 32 in the reverse or improper direction.

Pawl 43 is V pointed and freely journalled on shaft 42. This makes it possible to reverse or flip over pawl 43 as desired on shaft 42 so as to cause turntable 34 to rotate with meter shaft 32 in the event meter shaft 32 happens to be part of a meter that rotates counterclockwise for operation rather than clockwise for operation as is customarily the case. In this way, turntable 34 and the mechanism hereof may be intially rigged or set up to respond to either one of two types of meters, those having normal clockwise operation and those having normal counterclockwise operation. In either case, turntable 34 can be uncoupled automatically from meter shaft 32, in the event the meter shaft rotates in the improper direction in response to backflow in the line, by disengagement of pawl 43 from turntable stop 44.

The switch

On the upper end of rocker 36 are mounted clips 45 which hold a mercury tube switch 46 which has a hump or dimple 47 in its bottom center at and above which are located circuit contacts 48 to be bridged momentarily by a mercury bubble 49 within tube 46. Bubble 49 moves rapidly from end to end of tube 46 and only momentarily bridges contacts 48. At no time is it possible for bubble 49 to stop or remain in center or contact bridging position. On each movement of rocker 36, contacts 48 will be bridged for a moment. Thus, when turntable 34 moves and a pin 35 engages rocker 36 to move it, such movement will cause switch 46 to close the circuit momentarily. On return of rocker 36 by gravity to its normal vertical position, bubble 49 will move again and switch 46 will close the circuit again. This insures two momentary switch closings per pin 35 of turntable 34, the first occurring when a pin strikes rocker 36 and the second when the same pin releases rocker 36.

Closing of switch 46 closes the circuit between supply conductors 52 and conductors 53 leading to pump motor 21, the latter being in the form of a solenoid 54. Repeated energization of solenoid 54 will cause repeated operation of pump 22 for repeated injections of measured minute quantities of water treatment fluid from the tank 56 into branch line 12 through an outlet line 57 which connects pump 22 to branch line 12.

Pump 22, shown only partially in FIG. 2, is more clearly shown in a prior patent to Van B. Coldsnow, No. 2,530,682 of November 21, 1950 and will not here be described, it being sufficient to say that pump 22 is disposed in tank 56.

Pump 22 is connected at 88 to a rocker arm 87 in turn connected at 136 to armature rod 135 of solenoid 54. As solenoid 54 is energized, it rocks rocker arm 87 on fulcrum 87A to cause pump operation. Thus upon each actuation of solenoid 54, there is injected into line 57 a minute measured quantity of water treatment fluid within tank 56.

The arrangement here shown provides a system which injects minute measured quantities of water treatment fluid into branch line 12 in response to the rate of water flow into branch line 12 in the proper direction as indicated. The system will not operate in response to reverse flow in the branch line, nor will the system permit a continuing flow of treatment fluid to take place from pump 22 to pump outlet 57.

Figure 6:
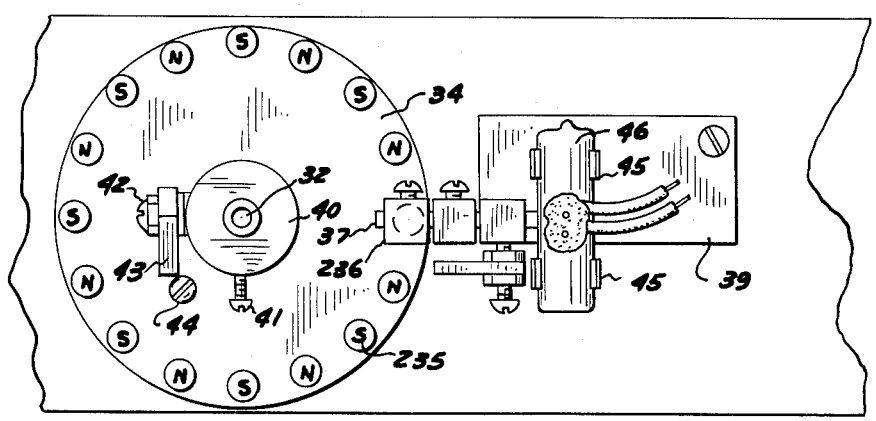
FIG. 6 is a top plan view of a modified form of switch actuator mechanism.
Figure 7:
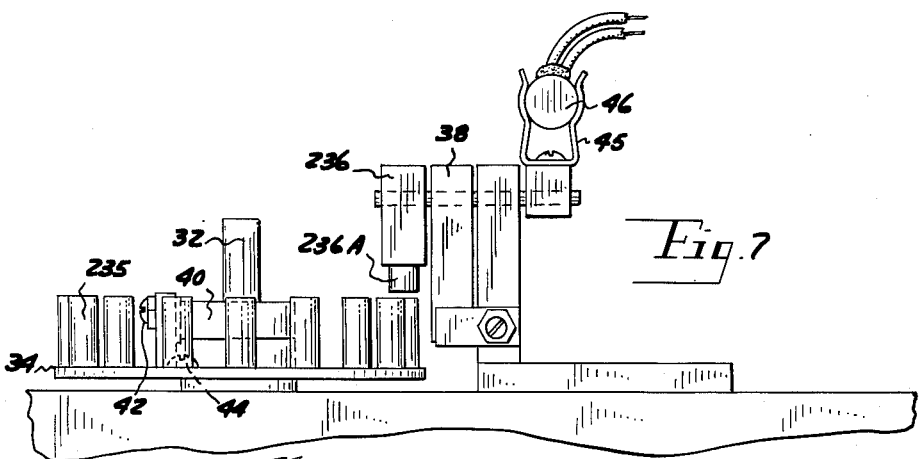
FIG. 7 is an elevation view.
Figure 8:
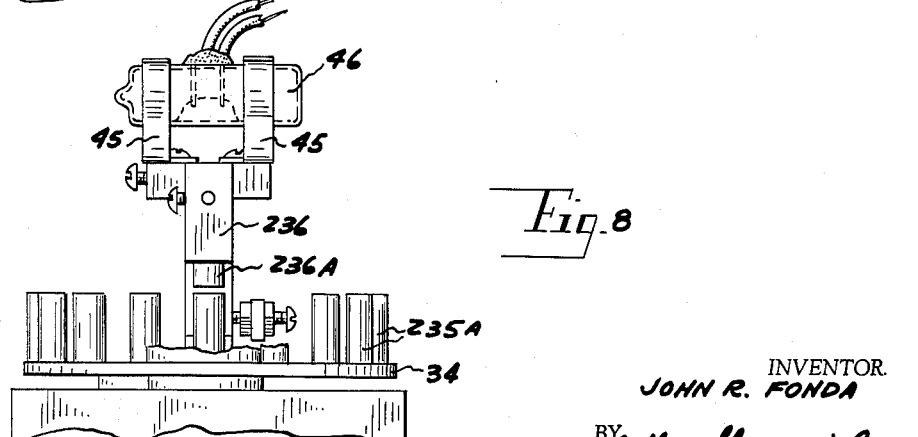
FIG. 8 is a side view as if from the right side of FIG. 6.

The magnetic form—FIGS. 6, 7 and 8

These figures show a construction differing from that of FIGS. 3 to 5 only in that turntable pins 235 are magnets of alternately reversed polarity as shown and the lower end 236A of rocker 236 is also a block of magnetic material whereby the turntable pins rock rocker 236 through magnetic action but without however engaging or striking rocker 236. This construction is particularly adapted for use in fire hazard areas where it is desirable to avoid the possibility of a spark being created by the striking of turntable pins against the lower end of the rocker, as in the device of FIGS. 3–5. The magnetic construction here disclosed is free of this characteristic which might in some instances be found objectionable.

Conclusion

Now having described the constructions herein disclosed, reference should be had to the claims which follow.

I claim:

1. The combination of a rotating shaft; a switch having circuit opening and closing mechanism including a mercury tube holder containing a mercury tube; a weighted rocker on the upper end of which the holder is mounted and having a pointed lower end, the rocker normally occupying a vertical position and its weight tending to return it to vertical; a horizontal rock shaft journalling the rocker; a horizontal turntable removably journalled on the rotating shaft below the rocker and having closely spaced vertical pins for engaging the pointed lower end of the rocker and receiving it between pins thereof to rock it out of vertical as the turntable rotates to present its pin successively to the lower end of the rocker; a unidirectional coupler coupling the rotating shaft to the turntable whereby rotation of the rotating shaft causes rotation of the turntable and whereby rotation of the turntable causes rapidly succeeding rockings of the rocker and of the mercury tube and rapidly succeeding switch closings; said coupler comprising a stop on the turntable and a vertical pawl horizontally journalled on a hub fixed to the rotating shaft and engaging the stop to bias it and rotate the turntable when the rotating shaft rotates it in one direction; said pawl being so journalled as to pass freely by said stop and not rotate it when the rotating shaft rotates in the opposite direction.

2. A combination according to claim 1 wherein the hub and pawl are removably mounted on the rotating shaft so as to be mountable thereon in either of two different positions for turntable drive by the rotating shaft in a selected one of two different shaft rotation directions.

References Cited by the Examiner
UNITED STATES PATENTS

| | | | |
|---|---|---|---|
| 965,754 | 7/10 | Schantz | 200—152 X |
| 1,856,599 | 5/32 | Sundstrand | 137—101.21 |
| 2,530,682 | 11/50 | Coldsnow | 137—101.21 |
| 2,868,904 | 1/59 | Smits | 200—32 |

KATHLEEN H. CLAFFY, *Primary Examiner.*

MARTIN P. SCHWADRON, ROBERT K. SCHAEFER, *Examiners.*